United States Patent [19]
Fukuo et al.

[11] Patent Number: 5,101,778
[45] Date of Patent: Apr. 7, 1992

[54] SOHC TYPE INTERNAL COMBUSTION ENGINE

[75] Inventors: Koichi Fukuo; Takatoshi Aoki; Kazutoshi Nishizawa, all of Saitama, Japan

[73] Assignee: Honda Giken Kogyo Kabushiki Kaisha, Tokyo, Japan

[21] Appl. No.: 696,776

[22] Filed: May 7, 1991

[30] Foreign Application Priority Data

May 7, 1990 [JP] Japan ................................. 2-117430

[51] Int. Cl.⁵ ............................ F01L 1/04; F01L 1/34
[52] U.S. Cl. ............................... 123/90.27; 123/90.16; 123/308
[58] Field of Search .................. 123/90.16, 90.27, 308

[56] References Cited

U.S. PATENT DOCUMENTS

| | | | |
|---|---|---|---|
| 4,556,025 | 12/1985 | Morita | 123/90.27 |
| 4,562,391 | 12/1985 | Simko | 123/90.27 |
| 4,662,323 | 5/1987 | Moriya | 123/90.27 |
| 4,671,222 | 6/1987 | Gallot et al. | 123/90.27 |
| 4,741,302 | 5/1988 | Oda et al. | 123/90.27 |
| 4,883,027 | 11/1989 | Oikawa et al. | 123/90.16 |
| 4,995,352 | 2/1991 | Machino | 123/90.27 |

FOREIGN PATENT DOCUMENTS

| | | | |
|---|---|---|---|
| 2919213 | 11/1980 | Fed. Rep. of Germany | 123/90.27 |
| 0235667 | 9/1988 | Japan | 123/90.27 |
| 0277906 | 11/1990 | Japan | 123/90.27 |

*Primary Examiner*—E. Rollins Cross
*Assistant Examiner*—Weilun Lo
*Attorney, Agent, or Firm*—Lyon & Lyon

[57] ABSTRACT

An SOHC type internal combustion engine comprises a pair of intake valves and a pair of exhaust valves, which are carried in a cylinder head, for opening and closing operation, at a small angle formed by axes of both the pairs of the valves in a projected view on a plane perpendicular to a crankshaft axis including an axis of a cylinder, a single cam shaft rotatably disposed above a combustion chamber, a single rocker shaft fixedly disposed above the combustion chamber, a plurality of intake rocker arms interposed between the cam shaft and the pair of intake valves and swingably carried on the rocker shaft, a pair of exhaust rocker arms interposed between the rocker shaft and the pair of exhaust valves and swingably carried on the rocker shaft, and a plug insertion cylindrical portion which is provided in the cylinder head between both the exhaust valves and into which is inserted a spark plug disposed at a substantially central portion of a ceiling surface of the combustion chamber. In this SOHC type internal combustion engine, a connection changeover mechanism is provided in the plurality of intake rocker arms for changing over the connection and disconnection of adjacent ones of the intake rocker arms to change the operation mode of the intake valves in accordance with the operational condition of the engine.

4 Claims, 6 Drawing Sheets

SOHC TYPE INTERNAL COMBUSTION ENGINE

BACKGROUND OF THE INVENTION

1. Field of the Invention

The field of the present invention is SOHC type internal combustion engines comprising a pair of intake valves and a pair of exhaust valves, which are carried in a cylinder head, for opening and closing operation, at a small angle formed by axes of the intake and exhaust valves in a projected view on a plane which extends perpendicular to an axis of a crankshaft and includes an axis of a cylinder, a single cam shaft rotatably disposed above a combustion chamber, a single rocker shaft fixedly disposed above the combustion chamber, a plurality of intake rocker arms interposed between the cam shaft and the pair of intake valves and swingably carried on the rocker shaft, a pair of exhaust rocker arms interposed between the rocker shaft and the pair of exhaust valves and swingably carried on the rocker shaft, and a plug insertion cylindrical portion which is provided in the cylinder head either between both the intake valves or between both the exhaust valves and into which a spark plug is inserted to be disposed at a substantially central portion of a ceiling surface of the combustion chamber.

2. Description of the Prior Art

Such SOHC type internal combustion engine has conventionally been known, for example, from Japanese Patent Application Laid-open No. 151104/80.

In the above prior art SOHC type internal combustion engine, the angle formed by the axes of the intake and exhaust valves is set at a small value, thereby defining a flattened combustion chamber to improve a combustion efficiency so as to meet a combustion of a fuel-air mixture having a small concentration of a fuel. However, disposition of the intake and exhaust valves at the small angle results in the fact that the opened area of each of intake and exhaust valve bores must be set at a relatively small level. In addition, the disposition of the plug insertion cylindrical portion either between both the intake valves or between both the exhaust valves results in a further reduced opened area of each of the intake and exhaust valve bores, thereby making it difficult to provide an increased output from the engine.

SUMMARY OF THE INVENTION

Accordingly, it is an object of the present invention to provide an SOHC type internal combustion engine wherein an improvement in output from the engine can be achieved while maintaining a high combustion efficiency, despite the disposition of intake and exhaust valves at a small angle therebetween.

To achieve the above object, according to the present invention, there is provided an SOHC type internal combustion engine comprising a connection changeover mechanism provided for the plurality of intake rocker arms for changing over connection and disconnection of adjacent ones of the intake rocker arms in accordance with an operational condition of the engine to change an operation mode of the intake valves in accordance with the operational condition of the engine, and the plug insertion cylindrical portion is disposed in the cylinder head with an axis of the cylindrical portion located between stem portions of the exhaust valves.

With such construction, it is possible to provide an improvement in combustibility by the flattened combustion chamber being defined by the intake and exhaust valves at the small angle therebetween, and to provide an improvement in output from the engine by changing the opening and closing mode of the intake valves in accordance with the operational condition of the engine by changingover the connection and disconnection of the intake rocker arms in accordance with the operational condition of the engine by the connection changeover mechanism provided at the plurality of the intake rocker arms. Moreover, it is possible to insure a space sufficient to dispose the plug insertion cylindrical portion between both the exhaust valves, because the plurality of intake rocker arms must be disposed adjacent one another by the provision of the connection changeover mechanism. Further, it is possible to avoid a reduction in opened area of the intake valve bores to prevent a reduction in output from the engine by the disposition of the spark plug between both the stem portions of the exhaust valves less influencing the output from the engine.

In addition to the above construction, according to the present invention, it is preferred that the plurality of intake rocker arms comprise first and second intake rocker arms operatively connected individually to the intake valves, and a third rocker arm disposed between the first and second intake rocker arms and capable of being liberated from the intake valves, the three intake rocker arms being relatively swingably carried on the rocker shaft adjacent one another, and the cam shaft is provided with a first cam for sliding contact with the third intake rocker arm and adapted primarily for a high speed operation of the engine, a second cam disposed adjacent the first cam for sliding contact with the first intake rocker arm and adapted primarily for a low speed operation of the engine, and a raised portion disposed adjacent the first cam on a side opposite the second cam for sliding contact with the second intake rocker arm, the raised portion being shaped to substantially halt the opening and closing operation of the intake valve operatively connected to the second intake rocker arm when the second intake rocker arm is disconnected from the third intake rocker arm.

Thus, if the connection changeover mechanism is brought into its disconnecting state, the intake valve operatively connected to the first intake rocker arm is opened and closed by the second cam, while the intake valve operatively connected to the second intake rocker arm is brought into a substantially inoperative state, so that a fuel-air mixture is supplied into the combustion engine substantially from the one intake valve and hence, a swirl can be produced within the combustion chamber to increase the combustibility.

An intake passage is provided in the cylinder head in correspondence to the intake valve operatively connected to the first intake rocker arm and is helically shaped to supply a fuel-air mixture into the combustion chamber while whirling it. This ensures that when the fuel-air mixture is supplied substantially only through the one intake valve into the combustion chamber, it is supplied into the combustion chamber while being whirled, enabling an increased swirl effect.

Further, a distance between both the exhaust valves is set larger than that between both the intake valves, and the plug insertion cylindrical portion is disposed so as to be inclined with its axis passing, in a projected view on a plane perpendicular to the crankshaft axis, on the side of the combustion chamber than a spring receiving seat mounted in the cylinder head for receiving the valve spring for biasing the exhaust valves in their closing directions. This makes it possible to avoid the interference of the plug insertion cylindrical portion with the spring receiving seat.

The above and other objects, features and advantages of the invention will become apparent from a reading of the following description of the preferred embodiment, taken in conjunction with the accompanying drawings.

BRIEF DESCRIPTION OF THE DRAWINGS

Drawings illustrate one embodiment of the present invention, wherein.

DESCRIPTION OF THE PREFERRED EMBODIMENT

The present invention will now be described by way of one embodiment in connection with the accompanying drawings.

Figure 1:
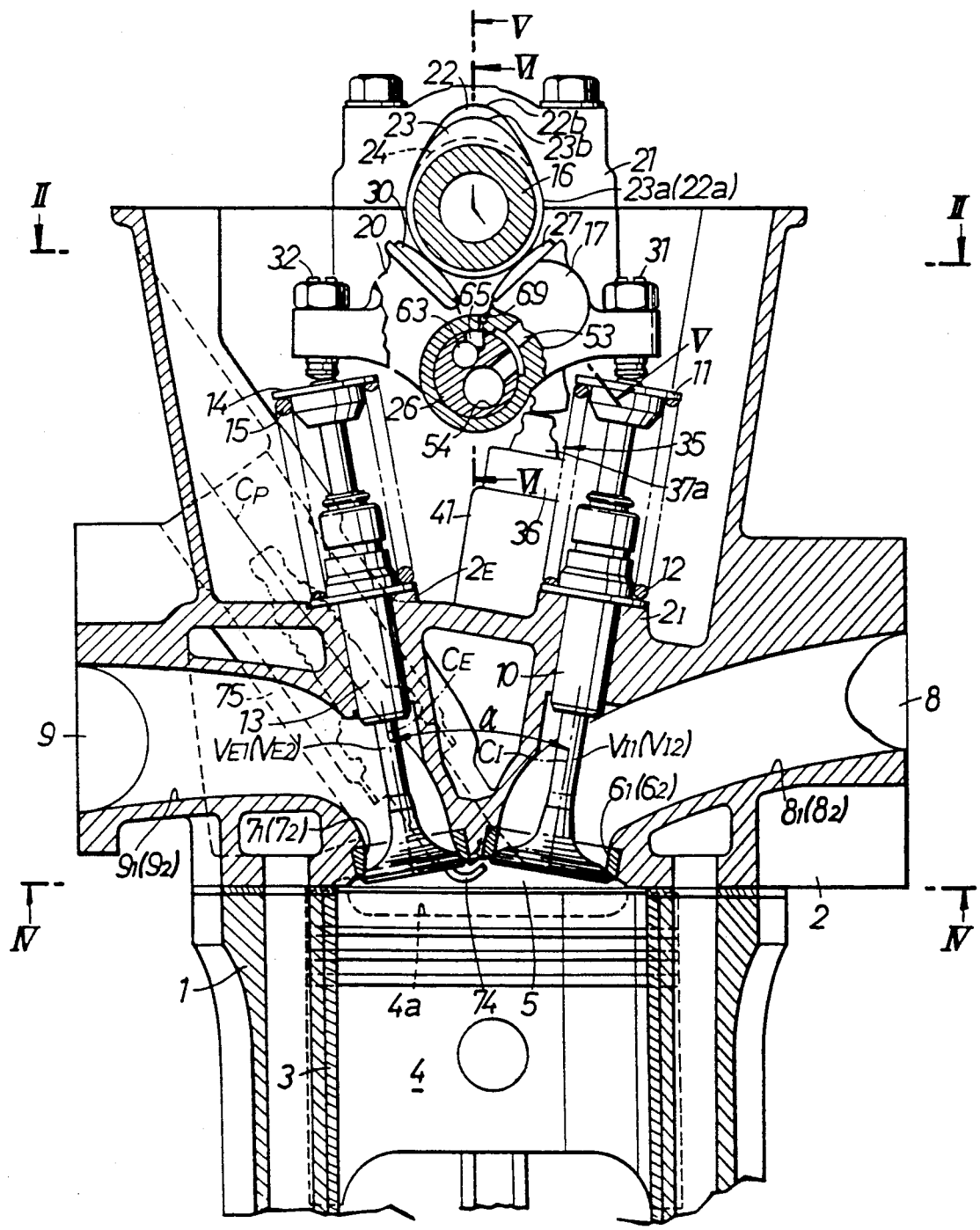
FIG. 1 is a longitudinal sectional view of an essential portion of an internal combustion engine, taken along a line I—I in FIG. 2.
Figure 2:
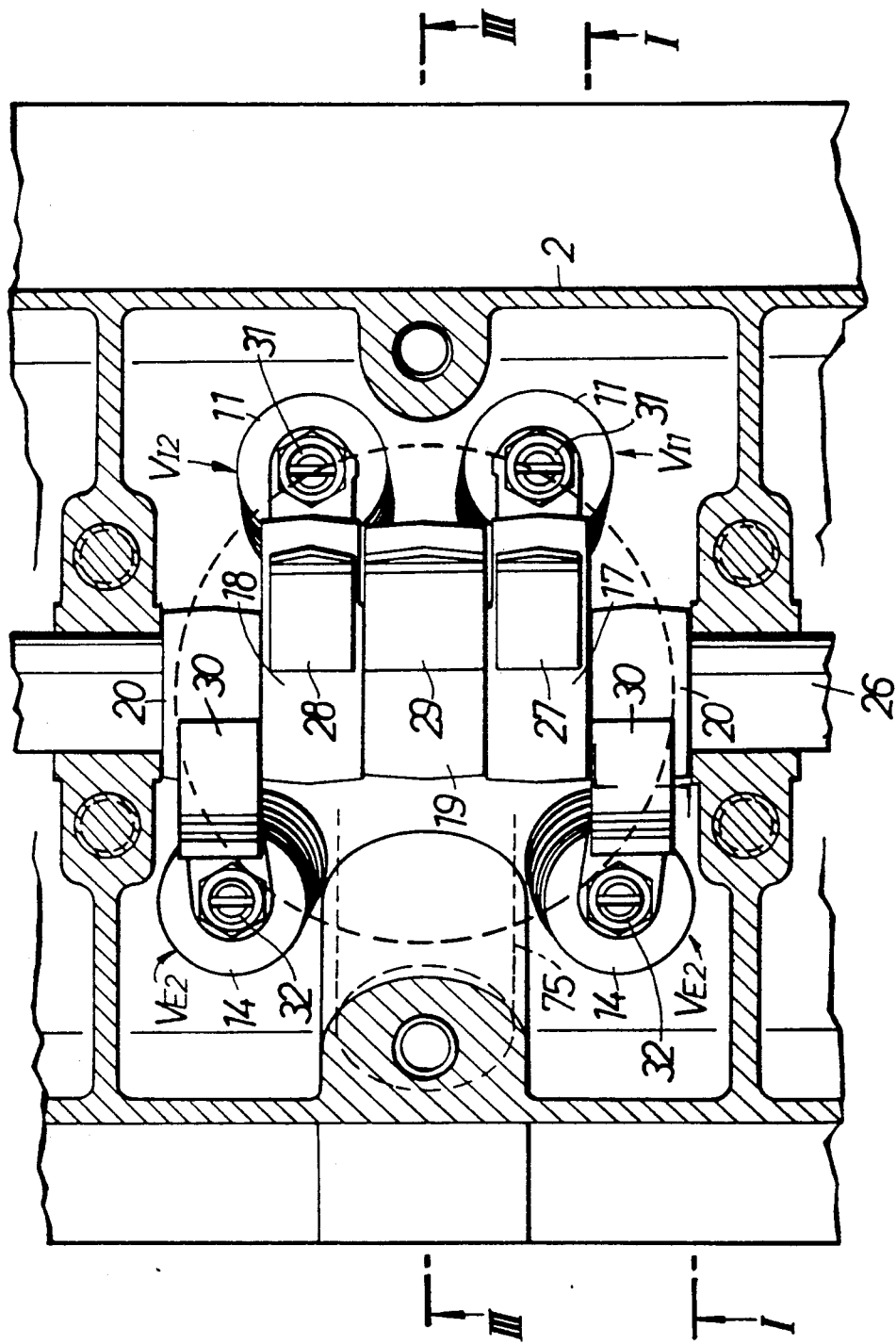
FIG. 2 is a sectional view taken along a line II—II in FIG. 1.
Figure 3:
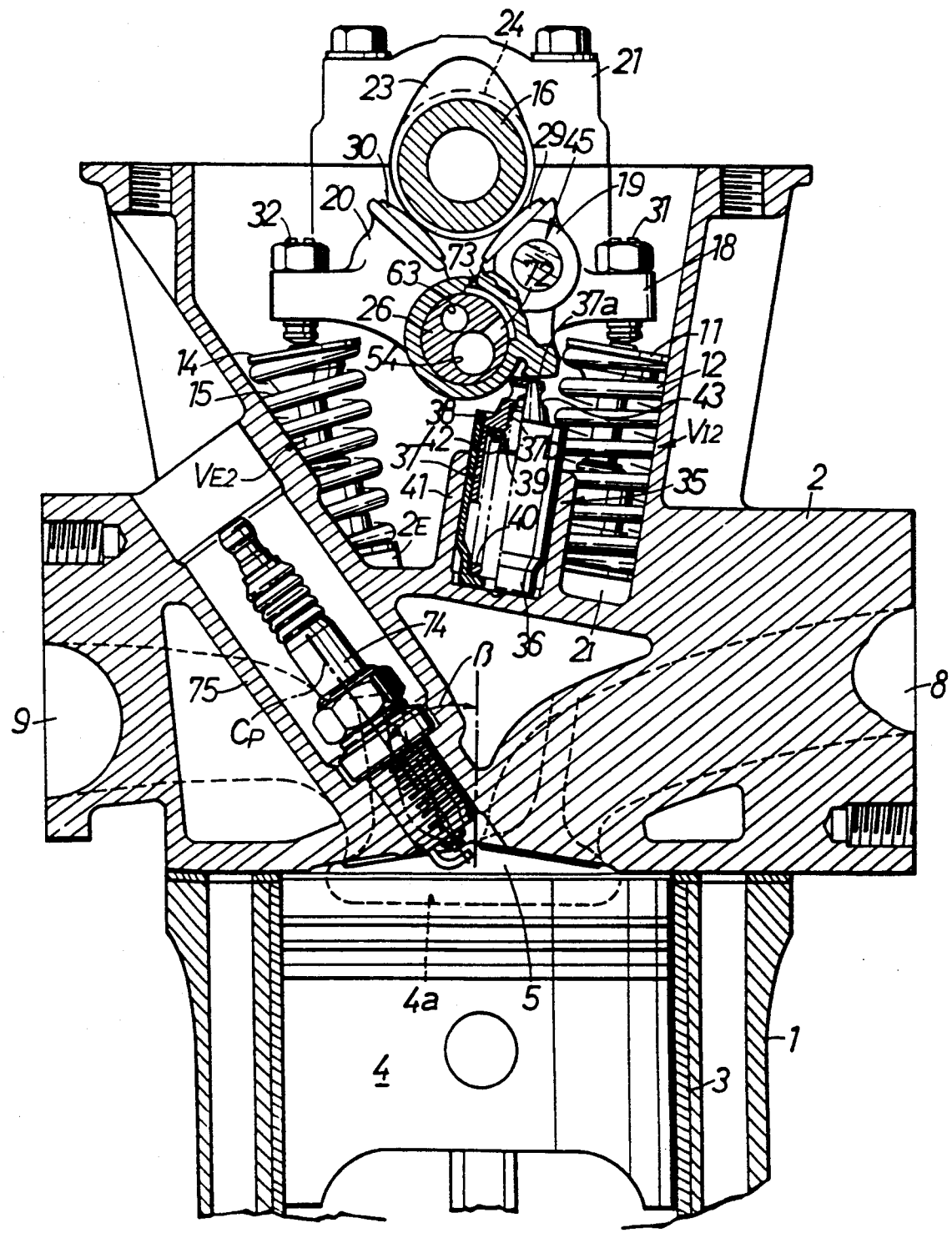
FIG. 3 is a sectional view taken along a line III—III in FIG. 2.

Referring first to FIGS. 1 to 3, an essential portion of an engine body in an SOHC type multi-cylinder internal combustion engine is comprised of a cylinder block 1 and a cylinder head 2 coupled to an upper surface of the cylinder block 1. A piston 4 is slidably received in a cylinder 3 mounted in the cylinder block 1 and has a depression 4a on an upper surface of the piston 4, and a combustion chamber 5 is defined between the upper surface of the piston 4 and the cylinder head 2.

Figure 4:
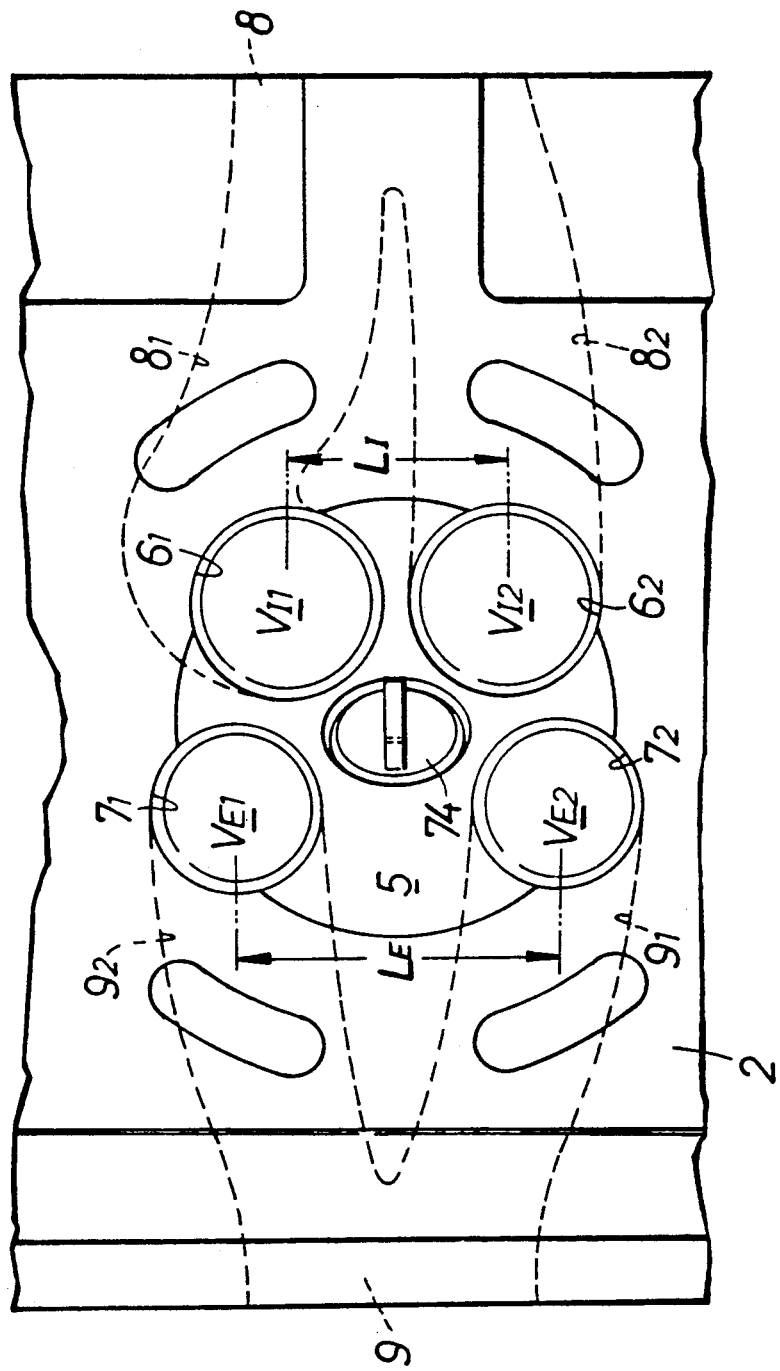
FIG. 4 is a view taken along an arrow IV—IV in FIG. 1.

Referring also to FIG. 4, the cylinder head 2 is provided with a pair of intake valve bores $6_1$ and $6_2$ and a pair of exhaust valve bores $7_1$ and $7_2$, which are opened into a ceiling surface of the combustion chamber 5. The distance $L_I$ between centers of the intake valve bores $6_1$ and $6_2$ is set smaller than the distance $L_E$ between centers of the exhaust valve bores $7_1$ and $7_2$ ($L_I < L_E$), and the opening area of the intake valve bores $6_1$ and $6_2$ is set larger than that of the exhaust valve bores $7_1$ and $7_2$. Intake passages $8_1$ and $8_2$ are provided in the cylinder head 2 to lead individually to the intake valve bores $6_1$ and $6_2$ and are commonly connected to a single intake port 8 which is opened into one side of the cylinder head 2. And exhaust passages $9_1$ and $9_2$ are provided in the cylinder head 2 to lead individually to the exhaust valve bores $7_1$ and $7_2$ and are commonly connected to a single exhaust port 9 which is opened into the other side of the cylinder head 2. Moreover, one $8_1$ of the intake passages $8_1$ and $8_2$ is helically shaped to provide a swirl flow to a fuel-air mixture in a portion extending from the intake port 8 to the intake valve bore $6_1$.

A pair of intake valves $V_{11}$ and $V_{12}$ are slidably received in a pair of cylindrical guides 10 disposed in the cylinder head 2 for separately opening and closing the intake valve bores $6_1$ and $6_2$, respectively. A coiled valve spring 12, 12 is interposed between a retainer 11 fixed on an upper end of each of the intake valves $V_{11}$ and $V_{12}$ projecting from the cylindrical guide 10 and a spring receiving seat $2_I$ provided at an upper portion of the cylinder head 2 to surround corresponding one of the intake valves $V_{11}$ and $V_{12}$, so that the intake valves $V_{11}$ and $V_{12}$ are biased upwardly, i.e., in a closing direction by the valve springs 12, 12. A pair of intake valves $V_{E1}$ and $V_{E2}$ are slidably received in a pair of cylindrical guides 13 disposed in the cylinder head 2 for separately opening and closing the exhaust valve bores $7_1$ and $7_2$, respectively. A coiled valve spring 15, 15 is interposed between a retainer 14 fixed on an upper end of each of the exhaust valves $V_{E1}$ and $V_{E2}$ projecting from the cylindrical guide 13 and a spring receiving seat $2_E$ provided at the upper portion of the cylinder head 2 to surround corresponding one of the intake valves $V_{E1}$ and $V_{E2}$, so that the exhaust valves $V_{E1}$ and $V_{E2}$ are biased upwardly, i.e., in a closing direction by the valve springs 15, 15.

Moreover, the intake valves $V_{11}$ and $V_{12}$ and the exhaust valves $V_{E1}$ and $V_{E2}$ are disposed with a small angle $\alpha$ (e.g., about 20° to 30°) formed by axes $C_I$ and $C_E$ of the valves $V_{11}$, $V_{12}$; $V_{E1}$, $V_{E2}$ in a projected view on a plane perpendicular to a crankshaft axis including an axis of the cylinder 3, i.e., on a plane parallel to sheets of FIGS. 1 and 3. This ensures that the combustion chamber 5 has a flattened shape, so that a high compression can be provided in the combustion chamber 5.

A first 17, a second 18 and a third intake rocker arm 19 are interposed between the intake valves $V_{11}$ and $V_{12}$ and a single cam shaft 16 operatively connected to a crankshaft (not shown) with a reduction ratio of ½ for converting the rotational motion to the opening and closing motions of the intake valves $V_{11}$ and $V_{12}$, and a pair of exhaust rocker arms 20, 20 are interposed between the exhaust valves $V_{E1}$ and $V_{E2}$ and the cam shaft 16.

Figure 5:
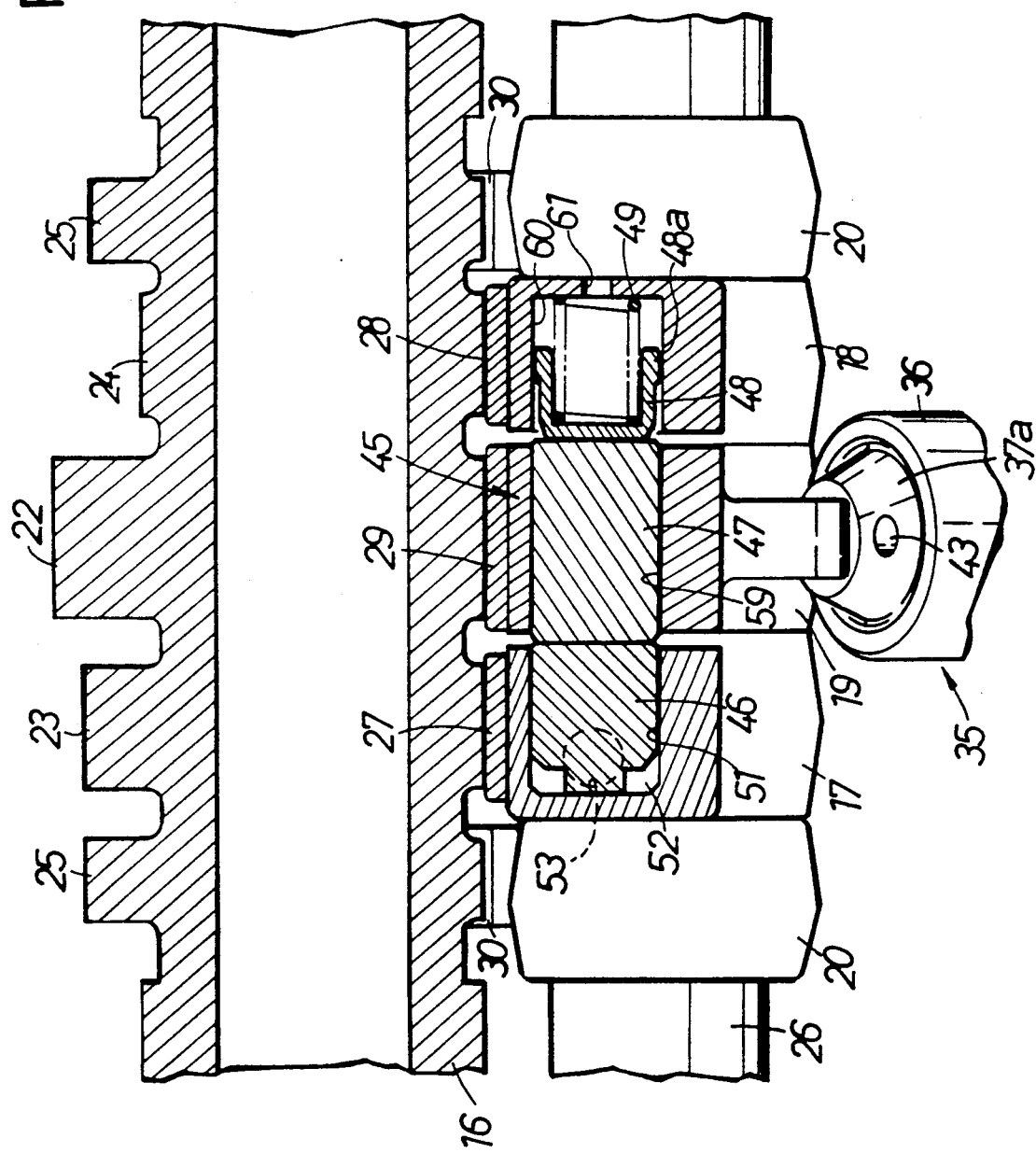
FIG. 5 is a sectional view taken along a line V—V in FIG. 1.
Figure 6:
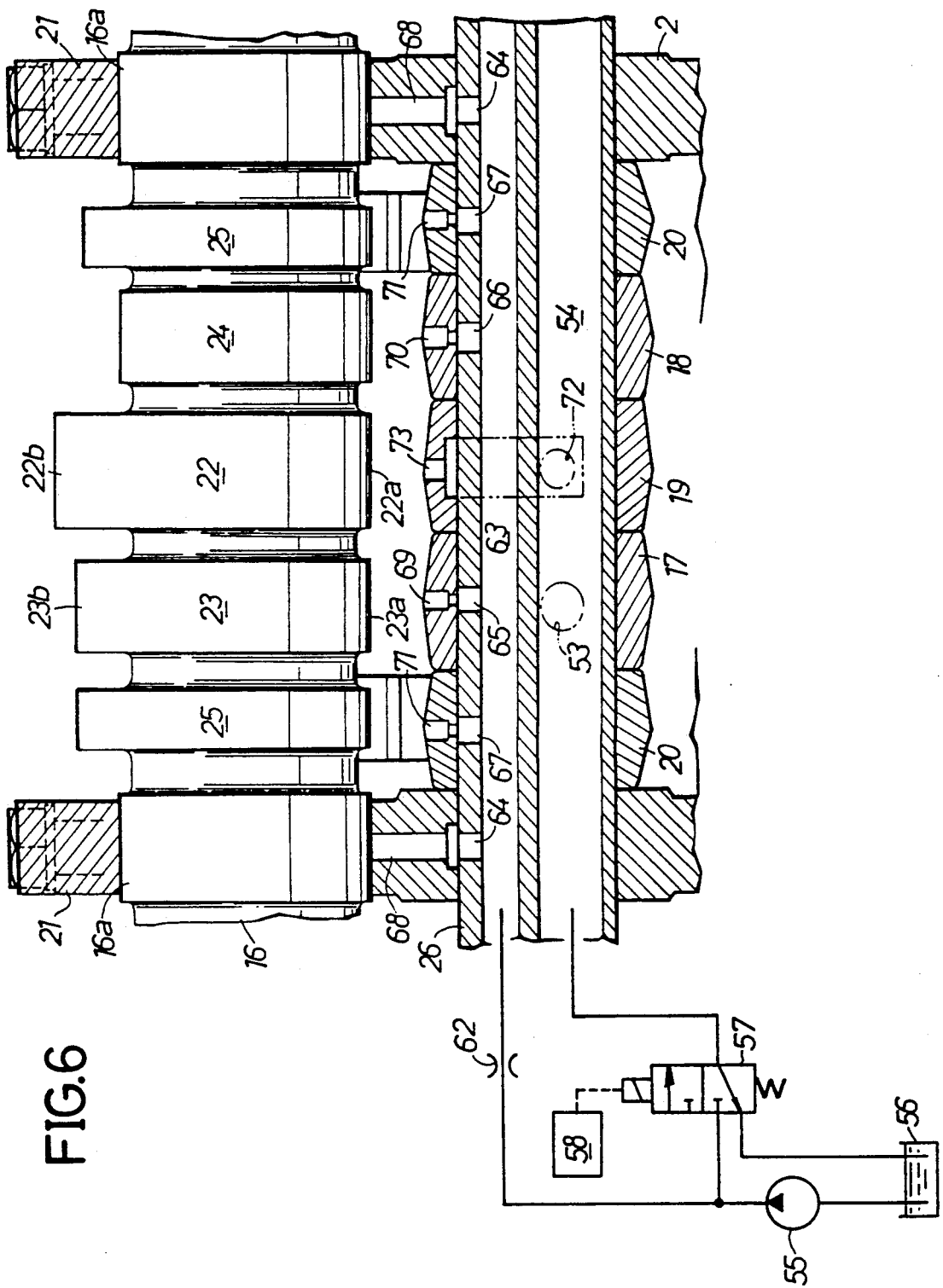
FIG. 6 is a sectional view taken along a line VI—VI in FIG. 1.

Referring also to FIGS. 5 and 6, the cam shaft 16 is rotatably supported above the combustion chamber 5 by the cylinder head 2 and a holder 21 coupled to the cylinder head 2 and has a horizontal axis perpendicular to the exis of the cylinder 3. The cam shaft 16 is integrally provided with a first cam 22 formed into a shape suitable primarily for a high speed operation of the engine, a second cam 23 formed into a shape suitable primarily for a lower speed operation of the engine adjacent one side of the first cam 22, and a raised portion 24 located adjacent the first cam on the opposite side from the second cam 23, and is further provided with two exhaust cams 25 on opposite sides of the second cam 23 and the raised portion 24. The first cam 22 has a shape suitable for opening and closing the intake valves $V_{11}$ and $V_{12}$ in a high speed operation region of the engine and includes a base circle portion 22a and a rising portion 22b projecting radially outwardly from the base circle portion 22a. The second cam 23 has a shape suitable for opening and closing one $V_{11}$ of the intake valves $V_{11}$ and $V_{12}$ and includes a base circle portion 23a and a rising portion 23b projecting from the base circle portion 23a with a smaller amount of projection in a radially outward direction of the cam shaft 16 than that of the rising portion 22b of the first cam 22 and over an extent of smaller central angle than that of the rising portion 22b. The raised portion 24 serves to substantially halt the operation of the other $V_{12}$ of the intake valves $V_{11}$ and $V_{12}$ in lower speed operation region of the engine and basically includes a circular outer surface corresponding to the base circle portions 22a and 23a of the first and second cams 22 and 23, but is provided with a slightly protruding projection in a portion corresponding to the rising portions 22b and 23b. Further, each of the exhaust cams 25, 25 has a shape suitable for opening and closing the exhaust valve $V_{E1}$ and $V_{E2}$, notwithstanding that the engine is in operation.

A rocker shaft 26 having an axis parallel to the cam shaft 16 is fixedly supported in the cylinder head 2 immediately below the cam shaft 16. Relatively swingably carried on the rocker shaft 26 are a base portion of the first intake rocker arm 17 operatively connected to the one intake valve $V_{11}$, a base portion of the second intake rocker arm 18 operatively connected to the other intake valve $V_{12}$, and a base portion of the third intake rocker arm 19 adjacently disposed between the first and second intake rocker arms 17 and 18. Base portions of the pair of exhaust rocker arms 20, 20 operatively connected individually to the exhaust valves $V_{E1}$ and $V_{E2}$ are swingably carried on the rocker shaft 26 outside the first and second intake rocker arms 17 and 18.

A cam slipper 27 is mounted on an upper surface of an intermediate portion of the first intake rocker arm 17 for sliding contact with the second cam 23 provided on the cam shaft 16, and a slipper 28 is mounted on an upper surface of an intermediate portion of the second intake rocker arm 18 for sliding contact with the raised portion 24 provided on the cam shaft 16. In addition, a cam slipper 30 is mounted on an upper surface of an intermediate portion of each of the exhaust rocker arms 20, 20 into sliding contact with corresponding one of the exhaust cams 25, 25 provided on the cam shaft 16.

A tappet screw 31 is screwed into a leading end of each of the first and second intake rocker arms 17 and 18 for advancing and retreating movement to abut against an upper end of each of the intake valves $V_{11}$ and $V_{12}$, so that the intake valves $V_{11}$ and $V_{12}$ are opened and closed in accordance with the swinging operation of the first and second intake rocker arms 17 and 18. A tappet screw 32 is screwed into a leading end of each of the exhaust rocker arms 20, 20 for advancing and retreating movement to abut against an upper end of each of the exhaust valves $V_{E1}$ and $V_{E2}$, so that the exhaust valves $V_{E1}$ and $V_{E2}$ are opened and closed in accordance with the swinging operation of the exhaust rocker arms 20, 20.

The cylinder head 2 is provided with a lost motion mechanism 35 adapted to resiliently urge the third intake rocker arm 19 toward the first cam 22.

The lost motion mechanism 35 comprises a bottomed cylindrical guide member 36 fixedly fitted in the upper portion of the cylinder head 2, a piston 37 slidably received in the guide member 36 and including a tapered abutment 37a formed at the end of the piston 37 closer to the third intake rocker arm 19 to abut against the third intake rocker arm 19, a stopper 38 detachably secured to an inner surface of the guide member 36 at a location closer to an opened end thereof to engage with the piston 37, and first and second springs 39 and 40 interposed between the piston 37 and the guide member 36 for resiliently biasing the piston 37 in a direction to abut against the third intake rocker arm 19.

The cylinder head 2 includes an upwardly projecting cylindrical support portion 41 provided at the upper portion thereof in a location corresponding to the third intake rocker arm 19, and the guide member 36 is fitted into the support portion 41 with an opened end of the guide member 36 turned upwardly. A retainer 42 is received between the piston 37 and the guide member 36 and capable of abutting against the piston 37. A first spring 39 having a relatively small spring constant is mounted in a compressed manner between the retainer 42 and the piston 37, and a second spring having a relatively large spring constant is mounted in a compressed manner between the retainer 42 and the closed end of the guide member 36.

A small diameter bottomed hole 37b is coaxially provided in an inner surface of a closed end of the piston 37, and the first spring 39 having a relatively small spring constant is contained in the small diameter hole 37b, thereby preventing the inclination of the first spring 39. A cross-shaped air bent hole 43 is provided in the abutment 37a of the piston 37 and opened into an outer surface of the abutment 37a to permit a space between the piston 37 and the guide member 36 to communicate with the outside in order to prevent the space between the piston 37 and the guide member 36 from being pressurized and depressurized during sliding operation of the piston 37.

A connection changeover mechanism 45 is provided in the first to third intake rocker arms 17 to 19 for changing over the connection and disconnection of the first to third intake rocker arms 17 to 19 in accordance with the operational condition of the engine.

The connection changeover mechanism 45 comprises a connecting piston 46 capable of connecting the first intake rocker arm 17 and the third intake rocker arm 19, a connecting pin 47 capable of connecting the third intake rocker arm 10 and the second intake rocker arm 18, a restraining member 48 for restraining the movement of the connecting piston 46 and the connecting pin 47, and a return spring 49 for biasing the connecting piston 46, the connecting pin 47 and the restraining member 48 to their disconnecting positions.

A first bottomed guide hole 51 is provided in the first intake rocker arm 17 in parallel with the rocker shaft 26 and opened toward the third intake rocker arm 19. The connecting piston 46 is slidably received in the first guide hole 51, and a hydraulic pressuer chamber 52 is defined between one end of the connecting piston 46 and a closed end of the first guide hole 51. A communication passage 53 is provided in the first intake rocker arm 17 to communicate with the hydraulic pressure chamber 52, and a hydraulic pressure supply passage 54 is provided within the rocker shaft 26. The hydraulic pressure supply passage 54 always communicates with the communication passage 53 and thus the hydraulic pressure chamber 52 despite the swinging of the first intake rocker arm 17.

An electromagnetic control valve 57 is interposed between the hydraulic pressure supply passage 54 and a hydraulic pump 55 and a reservoir 56. The electromagnetic control valve 57 is switchable between a deenergized position permitting the hydraulic pressure supply passage 54 to be put into communication with the reservoir 56 and an energized position permitting the hydraulic pressure supply passage 54 to be put into communication with the hydraulic pump 55 and is controlled in a switched manner by a control means 58, so that it assumes the deenergized position when the engine is in the low speed operation region, and it assumes the energized position when the engine is in the high speed operation region.

A guide hole 59 is provided in the third intake rocker arm 19 corresponding to the first guide hole 51 and in parallel to the rocker shaft 26 to extend over opposite sides of the third intake rocker arm 19, and the connecting pin 47 having one end abutting against the other end of the connecting piston 46 is slidably received in the guide hole 59.

A second bottomed guide hole 60 is provided in the second intake rocker arm 18 corresponding to the guide hole 59 and in parallel with the rocker shaft 26 and opened toward the third intake rocker arm 19, and the bottomed cylindrical restraining member 48 abutting against the other end of the connecting pin 47 is slidably received in the second guide hole 60. The restraining member 48 is disposed with its opened end directed to a closed end of the second guide hole 60 and has a collar 48a projecting radially outwardly at the opened end into slide contact with an inner surface of the second guide hole 60. The return spring 49 is mounted in a compressed manner between the closed end of the second guide hole 60 and the closed end of the restraining member 48, so that the connecting piston 46, the connecting pin 47 and the restraining member 48 abutting against one another are biased toward the hydraulic pressure chamber 52 by a spring force of the return spring 49. Moreover, a communication hole 61 is provided in the closed end of the second guide hole 60 for venting air and an oil.

A lubricant oil supply passage 63 is provided in the rocker shaft 26 in parallel to the hydraulic pressure supply passage 54 and is connected to the hydraulic pump 55 through an orifice 62. Thus, a lubricant oil having a low pressure resulting from constriction of a hydraulic pressure from the hydraulic pump 55 is supplied to the lubricant oil supply passage 63 during operation of the engine.

The rocker shaft 26 is provided with oil supply holes: an oil supply hole 64 corresponding to a journal portion 16a of the cam shaft 16; oil supply holes 65 and 66 corresponding to the first and second intake rocker arms 17 and 18, respectively; and oil supply holes 67, 67 corresponding to the exhaust rocker arms 20, 20, respectively. These oil supply holes being made into communication with the lubricant oil supply passage 63. On the other hand, a passage 68 is provided in the cylinder head 2 into communication with the oil supply hole 64 to supply the lubricant oil to the journal portion 16a. And ejection nozzles 69, 70, 71, 71 are provided in the base portions of the first and second intake rocker arms 17 and 18 and the base portions of the exhaust rocker arms 20, 20 to communicate with the oil supply holes 65, 66, 67, 67 and thus with the lubricant oil supply passage 63 in accordance with the swinging attitudes of the rocker arms 17, 18, 20, 20, respectively, in order to eject the lubricant oil in the lubricant oil supply passage 63 toward sliding contact portions of the intake rocker arms 17 and 18 and the exhaust rocker arms 20, 20 with the second cam 23, the raised portion 24 and the exhaust cams 25, 25, respectively. The ejection nozzles 69 and 70 are provided in the first and second intake rocker arms 17 and 18 so as to communicate with the lubricant oil supply passage 63 in a condition in which the first intake rocker arm 17 is in sliding contact with the base circle portion 23a of the second cam 23. The ejection nozzles 71, 71 are provided in the exhaust rocker arms 20, 20 so as to communicate with the lubricant oil supply passage 63 in a condition in which the exhaust rocker arms 20, 20 are in sliding contact with the base circle portion of the exhaust cams 25, 25.

An oil supply hole 72 is provided in the rocker shaft 26 corresponding to the third intake rocker arm 19 to communicate with the hydraulic pressure supply passage 54. An ejection nozzle 73 is provided in the base portion of the third intake rocker arm 19 into normal communication with the oil supply hole 72 for ejecting the lubricant oil toward a sliding contact portion of the cam slipper 29 with the first cam 22. Thus, when the hydraulic pressure supply passage 54 is put into communication with the hydraulic pump 55 through the electromagnetic control valve 57, a high hydraulic pressure is applied to the hydraulic pressure chamber 52 of the connection changeover mechanism 45, and the lubricant oil is ejected from the ejection nozzle 73 toward the sliding contact portion of the cam slipper 29 with the first cam 22.

Referring again to FIGS. 1 and 3, a spark plug 74 is disposed at a substantially central portion of the ceiling surface of the combustion chamber 5, and plug insertion cylindrical portion 75, into which the spark plug 74 is inserted, is provided in the cylinder head 2. The pair of exhaust rocker arms 20, 20 are disposed to come into sliding contact with the exhaust cams 25, 25 of the cam shaft 16 on opposite sides of the first to third intake rocker arms 17 to 19 disposed adjacent one another. This insures a relatively wide space between both the exhaust rocker arms 20, 20 and ensures that the distance between the exhaust valves $V_{E1}$ and $V_{E2}$ is relatively large, because the distance $L_E$ between the exhaust valve bores $7_1$ and $7_2$ adapted to be opened and closed by the exhaust valves $V_{E1}$ and $V_{E2}$ is set relatively large. Therefore, the spark plug 74 and thus the plug insertion tube 75 is disposed in the cylinder head 2 so that an axis $C_P$ of the spark plug 74 and thus the plug insertion cylindrical portion 75 is disposed between stem portions of the exhaust valves $V_{E1}$, $V_{E2}$ and passes below the spring receiving seat $2_E$ provided at the upper portion of the cylinder head 2 to receive the lower portions of the valve springs 15, 15. Moreover, the axis $C_P$ of the spark plug 74 and the plug insertion cylindrical portion 75 is established so that it is inclined at an angle $\beta$ with respect to the axis of the cylinder 3 in the projected view on the plane perpendicular to the crankshaft axis, i.e., on the plane parallel to the sheets of FIGS. 1 and 3, and the axis $C_P$ passes below the spring receiving seat $2_E$ provided at the upper portion of the cylinder head 2 to receive the lower portios of the valve springs 15, 15 for the exhaust valves $V_{E1}$ and $V_{E2}$, i.e., on the side of the combustion chamber 5 rather than the spring receiving seat $2_E$. The plug insertion cylindrical portion 75 is formed in the cylinder head 2, so that the cylindrical portion 75 is opened at the upper portion of the cylinder head 2 and the spark plug 74 inserted into the plug insertion cylindrical portion 75 faces to the central portion of the ceiling surface of the combustion chamber 5.

The operation of this embodiment will be described below. In the low speed operation region of the engine, the electromagnetic control valve 57 is in a state in which the hydraulic pressure supply passage 54 is in communication with the reservoir 56, so that the hydraulic pressure within the hydraulic pressure chamber 52 in the connection changeover mechanism 45 is released. Therefore, the connecting piston 46, the connecting pin 47 and the restraining member 48 are in their disconnected states in which they have been moved to the maximum toward the hydraulic pressure chamber 52 by the spring force of the return spring 49. In this condition, the abutment surfaces of the connecting piston 46 and the connecting pin 47 are in positions corresponding to between the first intake rocker arm 17 and the third intake rocker arm 19, and the abutment surfaces of the connecting pin 47 and the restraining member 48 are in positions corresponding to between the third intake rocker arm 19 and the second intake rocker arm 18. Therefore, the rocker arms 17 to 19 are in states in which they are angularly displaceable relative to one another.

In such disconnected condition, the first intake rocker arm 17 is swung in response to the sliding contact with the second cam 23 by rotation of the cam shaft 16, whereas the second intake rocker arm 18 is substantially inoperative, because it is in sliding contact with the raised portion 24. Therefore, substantially only the one intake valve V I$_1$ is opened and closed with a timing and a lift amount depending upon the shape of the second cam 23, so that a fuel-air mixture can be supplied through only the one intake valve bore 6$_1$ into the combustion chamber 5 to form a swirl within the combustion chamber 5, thereby providing an improved combustibility. Moreover, since the intake passage 8$_1$ connected to the intake valve bore 6$_1$ is helically shaped, the fuel-air mixture is supplied while being whirled toward the combustion chamber 5 to form a swirl more effectively, leading to an improved combustibility. In this case, the third intake rocker arm 19 is swung in response to the sliding contact with the first cam 22, but such swinging motion provides no influence to the first and second intake rocker arms 17 and 18. In addition, the exhaust valves V$_{E1}$ and V$_{E2}$ are opened and closed with a timing and a lift amount depending upon the shape of the exhaust cams 25, 25.

In the high operation region of the engine, the electromagnetic control valve 57 is switched over to put the hydraulic pressure supply passage 54 into communication with the hydraulic pump 55. This causes a high hydraulic pressure to be supplied into the hydraulic pressure chamber 52, and the connecting piston 46, the connecting pin 47 and the restraining member 48 in the connection changeover mechanism 45 are moved to their connected positions against the spring force of the return spring 49, so that the connecting piston 46 is received into the guide hole 59, and the connecting pin 47 is received into the second guide hole 60, thereby permitting the rocker arms 17 to 19 to be connected to one another. At this time, the third intake rocker arm 19 in slide contact with the first cam 22 is swingable in the largest amount and therefore, the first and second intake rocker arms 17 and 18 are swung along with the third intake rocker arm 19, and the intake valves V$_{11}$ and V$_{12}$ are opened and closed with a timing and a lift amount depending upon the shape of the first cam 22.

Moreover, in the high speed operation region, the exhaust rocker arms 20, 20 causes the exhaust valves V$_{E1}$ and V$_{E2}$ to be opened and closed with a timing and a lift amount depending upon the shape of the exhaust cams 25, 25 as in the low speed operation region.

By changing the opening and closing mode of the intake valves V$_{11}$ and V$_{12}$ between the high and low operation regions of the engine in this manner, a valve operating characteristic adapted for the operational condition of the engine can be achieved to provide an improvement in output from the engine. Consequently, notwithstanding that the opened areas of the intake valve bores 6$_1$ and 6$_2$ and the exhaust valve bores 7$_1$ and 7$_2$ must be set at a relatively small level due to the disposition of the intake valves V$_{11}$ and V$_{12}$ and the exhaust valves V$_{E1}$ and V$_{E2}$ at a smaller angle $\alpha$ formed by their axes C$_I$ and C$_E$, an improved output from the engine can be provided by changingover the connection and disconnection of the intake rocker arms 17 to 19 by the connection changeover mechanism 45 in accordance with the operational condition of the engine.

Moreover, since the plurality of intake rocker arms 17 to 19 must be disposed adjacent one another due to the provision of the connection changeover mechanism 45, a space can be insured sufficient to dispose the plug insertion cylindrical portion 75 between both the exhaust valves V$_{E1}$ and V$_{E2}$ as well as between both the exhaust rocker arms 20, 20. In addition, although the spark plug 74 is disposed in the cylinder head 2 so that it is inclined at an angle $\beta$ with respect to the axis of the cylinder 3 with its axis C$_P$ passing on the side of the combustion chamber 5 rather than the spring receiving seat 2$_E$, and the exhaust valve bores 7$_1$ and 7$_2$ contributing to the improvement in output from the engine to a lower extend as compared with the intake valve bores 6$_1$ and 6$_2$ each have a somewhat smaller opened area, it is possible to avoid the interference between the plug insertion cylindrical portion 75 into which the spark plug 74 is inserted and the spring receiving seat 2$_E$ and to reduce the influence of the disposition of the plug insertion cylindrical portion 75 exerted to the disposition of the exhaust rocker arms 20, 20 as well as to the valve springs 15, 15, thereby making the valve operating system more compact.

In such internal combustion engine, in addition to the hydraulic pressure supply passage 54 connected to the connection changeover mechanism 45, the lubricant oil supply passage 63 is provided in the rocker shaft 26 in parallel with the hydraulic pressure supply passage 54, so that the lubricant oil is supplied through the lubricant oil supply passage 63 to the journal portion 16$a$ of the cam shaft 16, the sliding contact portions of the first intake rocker arm 17 and the second cam 23, the sliding contact portions of the second intake rocker arm 18 and the raised portion 24 and the sliding contact portions of the exhaust rocker arms 20, 20 and the exhaust cams 25, 25. Accordingly, it is unnecessary to provide any exclusive pipe for supplying the lubricant oil and the like, leading to a reduction in number of parts and a simplified structure of a lubricating system.

Moreover, the lubricant oil is supplied to the sliding contact portions of the first intake rocker arm 17 and the second cam 23, the sliding contact portions of the second intake rocker arm 18 and the raised portion 24 and the sliding contact portions of the exhaust rocker arms 20, 20 and the exhaust cams 25, 25 in accordance with the swinging attitudes of the rocker arms 17, 18 and 20, 20 and therefore, it is possible to effectively supply the lubricant oil and to avoid the wasteful use of the lubricant oil.

Further, the lubricant oil is supplied to the sliding contact portions of the cam slipper 29 of the third intake rocker arm 19 and the first cam 22 only when the connection changeover mechanism 45 is operated for connection, i.e., only when the engine is in the high speed operation region, causing the first cam 22 to operate the intake rocker arms 17 to 19 for opening and closing the valves. Therefore, the lubricant oil can be supplied in correspondence to a high loading, leading to an efficient supplying of the lubricant oil.

What is claimed is:

1. An SOHC type internal combustion engine comprising:
    a pair of intake valves and a pair of exhaust valves, which are carried in a cylinder head, for opening and closing operation, at a small angle formed by axes of the intake and exhaust valves in a projected view on a plane which extends perpendicular to an axis of a crankshaft and includes an axis of a cylinder;

a single cam shaft rotatably disposed above a combustion chamber;

a single rocker shaft fixedly disposed above the combustion chamber;

a plurality of intake rocker arms interposed between said cam shaft and the pair of intake valves and swingably carried on said cam shaft;

a pair of exhaust rocker arms interposed between said rocker shaft and the pair of exhaust valves and swingably carried on said rocker shaft; and a plug insertion cylindrical portion which is provided in the cylinder head between both the exhaust valves and into which a spark plug is inserted to be disposed at a substantially central portion of a ceiling surface of said combustion chamber, wherein said internal combustion engine further includes a connection changeover mechanism provided for said plurality of intake rocker arms for changing over connection and disconnection of adjacent ones of the intake rocker arms to change an operation mode of the intake valves in accordance with an operational condition of the engine, and said plug insertion cylindrical portion is disposed in said cylinder head with an axis of the cylindrical portion located between stem portions of said exhaust valves.

2. An SOHC type internal combustion engine according to claim 1, wherein said plurality of intake rocker arms comprise first and second intake rocker arms operatively connected individually to the intake valves, and a third rocker arm disposed between the first and second intake rocker arms and capable of being liberated from the intake valves, the three intake rocker arms being relatively swingably carried on the rocker shaft adjacent one another, and said cam shaft is provided with a first cam for sliding contact with the third intake rocker arm and adapted primarily for a high speed operation of the engine, a second cam disposed adjacent the first cam for sliding contact with the first intake rocker arm and adapted primarily for a low speed operation of the engine, and a raised portion disposed adjacent the first cam on a side opposite the second cam for sliding contact with the second intake rocker arm, said raised portion being shaped to substantially halt the opening and closing operation of the intake valve operatively connected to the second intake rocker arm when the second intake rocker arm is disconnected from the third intake rocker arm.

3. An SOHC type internal combustion engine according to claim 2, further including an intake passage provided in the cylinder head in correspondence to the intake valve operatively connected to the first intake rocker arm, said intake passage being helically shaped so as to supply a fuel-air mixture into the combustion chamber while whirling the fuel-air mixture.

4. An SOHC type internal combustion engine according to claim 1, wherein a distance between both the exhaust valves is set larger than that between both the intake valves, and said plug insertion cylindrical portion is disposed so as to be inclined with its axis passing, in a projected view on a plane perpendicular to the crankshaft axis, below a spring receiving seat provided in the cylinder head for receiving the valve spring for biasing the exhaust valves in their closing directions.

* * * * *

UNITED STATES PATENT AND TRADEMARK OFFICE
CERTIFICATE OF CORRECTION

PATENT NO. : 5,101,778
DATED      : April 7, 1992
INVENTOR(S): Fukuo et al.

It is certified that error appears in the above-identified patent and that said Letters Patent is hereby corrected as shown below:

IN THE CLAIMS:

Claim 1, column 11, line 13, delete "rocker" and insert -- cam --.

Signed and Sealed this

Twenty-sixth Day of October, 1993

Attest:

BRUCE LEHMAN

Attesting Officer          Commissioner of Patents and Trademarks